United States Patent

Koerner et al.

[11] 4,064,057
[45] Dec. 20, 1977

[54] TEXTILE FIBER FINISHES

[75] Inventors: Götz Koerner; Günter Schmidt; Jaroslav Langner, all of Essen; Hans-Jürgen Patzke, Gelsenkirchen-Resse, all of Germany

[73] Assignee: Th. Goldschmidt AG, Essen, Germany

[21] Appl. No.: 748,726

[22] Filed: Dec. 9, 1976

[30] Foreign Application Priority Data

Dec. 10, 1975 United Kingdom ............... 50681/75

[51] Int. Cl.² .......................................... D06M 11/00
[52] U.S. Cl. .............................. 252/8.6; 106/287 SB; 252/49.6
[58] Field of Search ................................ 252/8.6, 8.9; 106/287 C; 260/448.8 R, 448.2

[56] References Cited

U.S. PATENT DOCUMENTS

| | | | |
|---|---|---|---|
| 2,838,455 | 6/1958 | Tompkins | 252/8.6 |
| 3,115,512 | 12/1963 | Rossing et al. | 252/8.9 |
| 3,140,198 | 7/1964 | Dawon et al. | 252/8.9 |
| 3,341,452 | 9/1967 | Cooley | 252/8.9 |
| 3,519,562 | 7/1970 | Lanner | 252/8.9 UX |
| 3,634,236 | 1/1972 | Buster et al. | 252/8.9 |
| 3,954,635 | 5/1976 | Cummings et al. | 252/8.9 |
| 3,968,042 | 7/1976 | Erickson | 252/8.9 |
| 3,992,332 | 11/1976 | Zenon | 252/8.9 |

*Primary Examiner*—William E. Schulz
*Attorney, Agent, or Firm*—Toren, McGeady and Stanger

[57] ABSTRACT

Melt-spin finish compositions composed of 1 – 99% by weight of compounds having the general formula

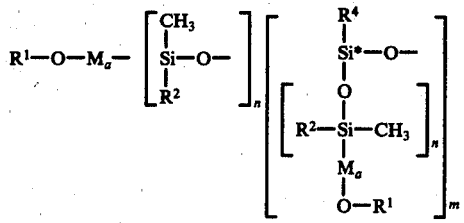

-continued

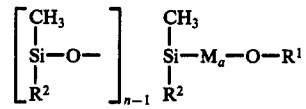

wherein
R¹ is a mono-, di- or trialkylphenyl residue, in which the sum of the carbon atoms per phenyl residue, bound in the form of alkyl residues, is at least 6 and at most 12, and/or the trimethylsilyl residue,
R² is an alkyl residue with 1 to 16 carbon atoms, whereby the carbon chain may be interrupted by the groupings

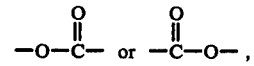

and/or the $M_a$-O-R³ residue, whereby
R³ is a mono-, di- or trialkylphenyl residue, whereby the sum of the carbon atoms per phenyl residue, bound in the form of alkyl residues, is at least 6 and at most 12, and/or is the

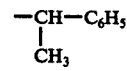

residue,
R⁴ is an alkyl residue with 1 to 16 carbon atoms and-/or

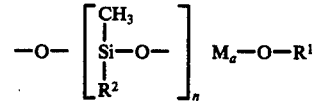

M is an alkyl residue with 1 to 3 carbon atoms, the index
n may have any value from 2.5 to 15,
m a value of 0 to 5, and
a a value of 0 or 1, and the average molecule contains 5 to 30 Si atoms of which at most 20 mole percent are Si* atoms, and 0.5 to 10 mono-, di- or trialkylphenyl residues, in addition to 99 – 1% by weight of known finish components.

The finish compositions of the present invention possess not only exceptional thermal stability but also confer excellent frictional properties to the melt-spun fibers.

12 Claims, No Drawings

TEXTILE FIBER FINISHES

BACKGROUND OF THE INVENTION

1. Field of the Invention

The invention relates to preparations for treating fibers, such preparations being especially suitable as finishing agents for synthetic fibers obtained from melt spinning and especially polyester fibers thus prepared.

2. Description of the Prior Art

Polydimethylsiloxanes are used in spinning plants for finishing melt-spun fibers. This use becomes possible because of the fact that polydimethylsiloxanes, which generally are referred to simply as silicone oils, endow the treated fibers with a low coefficient of friction, especially at high yarn-take-off rates, whereby this coefficient has only a slight temperature dependence. In addition, silicone oils are unusually heat stable and have a low viscosity-temperature coefficient.

The finishing of melt-spun yarns directly after their manufacture makes possible the subsequent drawing and texturizing processes. The finish must be effective both as a lubricant and as an antistat. In the thermal fixation processes to which the yarn is subjected, components of the finish are flung off onto the heating unit where they are exposed to heat for a long time. For this reason, the finish must be thermally stable. Those parts of the finish which are deposited on the heating units should, as far as possible, not yellow or evaporate, and most importantly, not gel. At the same time, the constituents of the finish should be as compatible as possible with one another. This is a problem especially when it is important to have compatibility between the polar, surface active components, which are responsible primarily for the antistatic effect, and the nonpolar methylsilicone oils which are responsible primarily for the lubricating properties.

The compatibility of methylsilicone oils can be improved, if methyl groups are partially replaced by longer chained alkyl groups. The resulting oils are then, however, no longer sufficiently thermally stable. In addition, the viscosity-temperature coefficient of methylsilicone oils, modified in such a manner, increases greatly.

Even the partial replacement of methyl groups by phenyl groups leads to products with higher viscosity-temperature coefficients whose lubricating properties are impaired.

SUMMARY OF THE INVENTION

We have surprisingly found that certain aryloxy-substituted silicone oils proved to be superior components of melt-spin finishes in comparison to the hitherto known oils used in the art. The compatibility of these aryloxy-substituted silicone oils is surprisingly better than of the oils previously used. These aryloxy-substituted silicone oils possess exceptional thermal stability and confer excellent frictional properties to the melt-spin finishes. In addition, these aryloxy-substituted silicone oils are easily synthesized at a relatively attractive cost.

Accordingly, the invention relates to a textile fiber finish, especially a melt-spin finish, characterized by a content of 1 – 99% by weight of compounds of the general formula

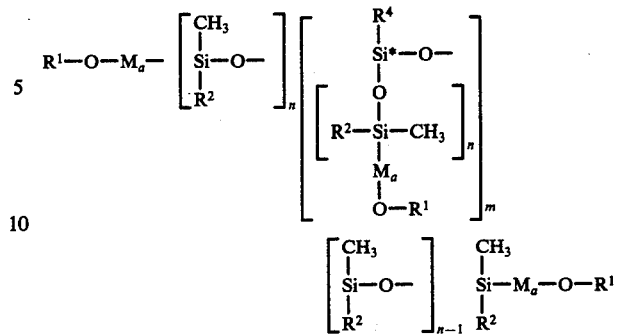

wherein $R^1$ is a mono-, di- or trialkylphenyl residue, in which the sum of the carbon atoms per phenyl residue, bound in the form of alkyl residues, is at least 6 and at most 12, and/or the trimethylsilyl residue, $R^2$ is an alkyl residue with 1 to 16 carbon atoms, whereby the carbon chain may be interrupted by the groupings

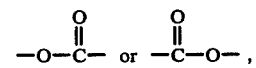

and/or the $M_a$-O-$R^3$ residue, whereby $R^3$ is a mono-, di- or trialkylphenyl residue, whereby the sum of the carbon atoms per phenyl residue, bound in the form of alkyl residues, is at least 6 and at most 12, and/or is the

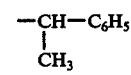

residue, $R^4$ is an alkyl residue with 1 to 16 carbon atoms and/or

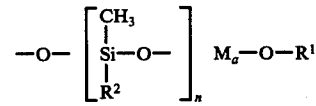

M is an alkyl residue with 1 to 3 carbon atoms, the index $n$ may have any value from 2.5 to 15, $m$ a value of 0 to 5, and $a$ a value of 0 or 1, and the average molecule contains 5 to 30 Si atoms of which at most 20 mole percent are Si* atoms, and 0.5 to 10 mono-, di- or trialkylphenyl residues, in addition to 99 – 1% by weight of known finish components.

The formula represents an average formula of the polymer mixture.

DESCRIPTION OF THE PREFERRED EMBODIMENTS

Preferably, $R^1$ represents an octyl, dodecyl or nonylphenyl residue, the nonlphenyl residue being especially preferred. The octyl, dodecyl and nonylphenyl residues are introduced into the siloxanes by using, as starting material, commercially available octyl-, dodecyl- or nonylphenols, which are obtained by reacting phenol with diisobutylene, tetrapropylene or tripropylene.

With this definition, the $R^1$ residue can, however, also represent a 2,6-di-isopropylphenyl, 2,6-di-isobutylphenyl or 2,6-di-tert.-butylphenyl group.

Preferably, $R^2$ is a methyl residue. Further examples of suitable residues are:

$C_2H_5-$, $C_3H_7-$, $C_{10}H_{21}-$, $C_{12}H_{25}-$, $-(CH_2)_3OAc$,

Ac = saturated aliphatic acyl residue with 1 to 12 carbon atoms, e.g.,

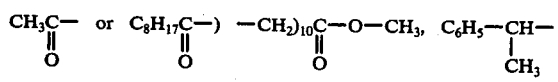

m has a value up to 5, but preferably, however, is 0. In this case, the formula represents a linear organosilicon compound.

n has a value of 2.5 to 15, preferably 5 to 10.

a has a value of 0 or 1, and preferably, a = 0. In this case, the alkylated phenyl residue or the trimethylsilyl residue is linked to the neighboring silicon atom via an oxygen atom.

Preferably, the organosilicon compounds contain 10 to 20 Si atoms and 2 alkylphenyl residues.

Examples of organosilicon compounds which can be used in accordance with the invention and which, from the point of view of their properties, are especially preferred for treating fibers, are

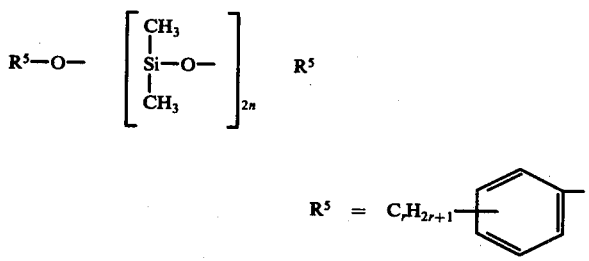

whereby the substituent $C_rH_{2r+1}$ is mainly in the para position, r = 8 to 12 n = preferably 5 to 10

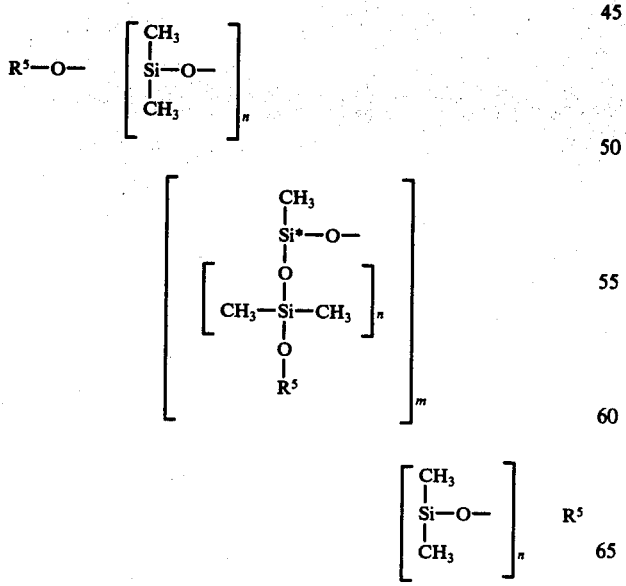

$R^5$ = as above n = 2.5 to 9.66, preferably, 4 to 8 m = 1 to 5 whereby each molecule contains 10 - 30 Si atoms, of which, however, not more than 20 mole percent consist of Si* atoms.

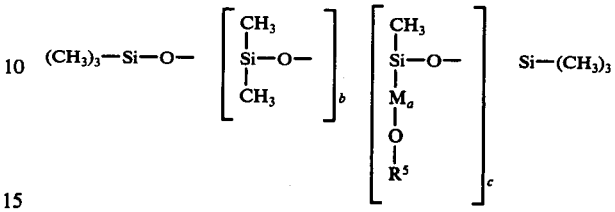

$R^5$ = as above b = 2.5 to 27.5 c = 0.5 to 10, preferably 2 to 5

$M = -CH_2CH_2-$ or $-CH_2CH_2CH_2-$ a = 0 or 1, preferably 0

The viscosity of the aryloxy substituted silicone oils described preferably lies within the range of 30 to 100 cP (20° C). The relatively low viscosity is a prerequisite for rapid spreading of the finishes.

The organosilicon compounds, which can be used in the inventive finishes, can be synthesized by known procedures. The compounds, which can be used in accordance with the invention and in which the mono-, di- or trialkylphenyl molecules are linked to the siloxane molecule via an Si-O-C bond, can be synthesized by a large number of known procedures. The compounds may be synthesized simply by reacting the appropriate mono-, di- or trialkylphenols with equilibrated chlorosiloxanes or chlorosiloxanyl sulfates, using suitable acid acceptors, as described in U.S. Pat. No. 3,115,512. A different synthesis procedure consists of reacting the appropriate mono-, di- or trialkylphenols with equilibrated siloxanes, containing SiH bonds, hydrogen being split off during the reaction. It is appropriate to use a suitable catalyst, such as, Sn octoate, in this reaction. Processes of this type are shown in British Pat. No. 954,041, with the difference that polyether monools and not alkylphenols are used as reaction partners in the process of the patent.

Organosilicon compounds in which the mono-, di- or trialkylphenyl residues are liked to the siloxane molecule via Si-C bonds, can be synthesized especially by two known procedures:

a. By addition of the appropriate allyl or vinyl ethers of mono-, di- or trialkylphenols to equilibrated siloxanes containing SiH bonds, while using Pt catalysts, such as, $H_2PtCl_6$, according to the following outline:

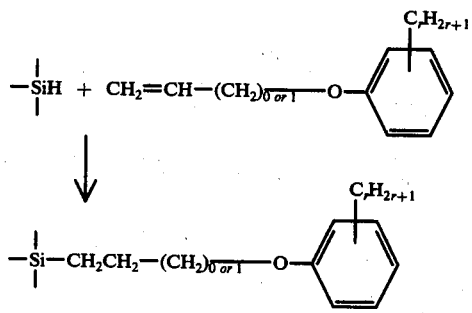

r = as already defined

This reaction is very common for the synthesis of so-called organofunctional siloxanes. An example of such an addition of unsaturated ethers to SiH-group containing siloxanes is the addition of an alkenyl group containing polyether, which is described in U.S. Pat. No. 2,868,824.

b. By reacting siloxanes with —SiCH$_2$-halogen groups with the appropriate mono-, di- or trialkylphenols in the presence of acid acceptors. According to the following reaction outline

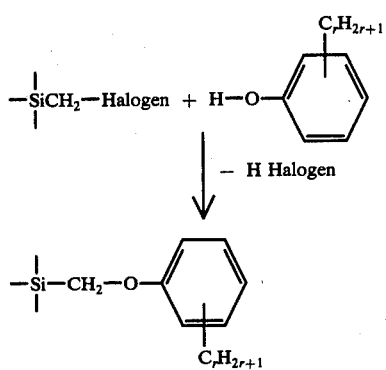

mono-, di- or trialkylphenoxy-substituted siloxanes are formed which are linked via a CH$_2$ group. Such a process is described on Page 321 of the Monograph of W. Noll, "Chemie und Technologie der Silicone", published in 1968 by Chemie, where the phenolic component 4,4'-dihydroxydiphenylpropane is used, which is not in accordance with the invention.

As explained above, the object of the invention are finishes which contain the aryloxy-substituted silicon oils as active materials in amount of 1 - 99% by weight (referred to in the following as substances of Group A), in addition to 99 - 1% by weight of known finish components.

Examples of such known finish components are those substances, which are also nonpolar and which do not impair the lubricating properties even at high yarn-take-off rates (Group B). This Group B includes, for example, the so-called ester oils, such as, fatty acid esters of polyols. Such compounds are, for example, trimethylolpropane tripelargonate or pentaerythritol tetrapelargonate or esters of monools, such as, hexadecyl stearate, butyl stearate or oleyl oleate. Dialkyl phthalates can also be described as ester oils. Of special interest are those dialkyl phthalates which are derived from branched secondary and primary alcohols. Ester oils, derived from aliphatic dicarboxylic acids, can also be used. Mineral oils or liquid oligomeric polyolefins are economically more favorable finish components. Such finish components are, however, inferior to ester oils with respect to their thermal stability.

Hydrophobic polypropylene glycols may also be regarded as essentially nonpolar components which, however, in comparison with the ester oils, possess disadvantages in regard to their thermal load carrying capacity. The viscosities (20° C) of the nonpolar or weakly polar oil of this Group B lie, as a rule, between 5 and 100 cP and, preferably, between 10 and 60 cP.

Melt-spin finishes generally contain additional compounds which can be divided up into Group C and Group D, depending on whether their polarity is more or less marked.

The task of the moderately polar, nonionic components of Group C is, inter alia, to develop an average antistatic effect and, if necessary, to improve the compatibility of the nonpolar components (Group B) with the strongly polar ionic components (Group D). The latter components are customarily used especially as highly effective antistats.

Typical representatives of nonionic finish components are water-soluble or water-dispersible ethylene oxide adducts of fatty acids, fatty alcohols, fatty amines or fatty acid amides, whereby the liquid, low viscosity representatives of this group are preferred.

Especially suitable is $C_{12}H_{25}N(CH_2CH_2OH)_2$, whereby the $C_{12}H_{25}$-residue represents an appropriate mixture of $C_8H_{17}$—, $C_{10}H_{21}$—, $C_{12}H_{25}$—, $C_{16}H_{33}$— and $C_{18}H_{37}$— residues. The OH groups may be completely or partially esterified or etherified. Ethylene oxide adducts to polyesters from fatty acids, such as, glycerol or sorbitol esters, e.g., sorbitol monooleate or glycerol trioleate, and also suitable. The ethylene oxide adducts of alkylphenols, such as, for example, nonylphenol, represent nonionic components of finishes which are especially thermally stable.

The highly polar finish components of Group D which usually consist of liquid, organic surfactants having ionic groups, can be anionic, amphoteric or cationic. These compounds have attained significance especially as highly effective antistatic acting additives. Typical anionic surfactants of this group are alkali salts of alkyl phosphates or alkyl phosphonates, e.g., Na-octyl-1 ½-phosphate. In addition, sulfurated mineral oils or fatty alcohol sulfates or alkyl polyether sulfates can also be used. Alkali salts of, if necessary, unsaturated, higher molecular weight fatty acids also belong to this group. Further representatives of this group are alkali salts of alkylbenzene sulfonates. Typical amphoteric surfactants of this group are the surface active betaines. Special significance as melt-spin components has been attained by the cationic surfactants, especially alkyltrimethylammonium sulfate, e.g., the trimethylammonium methylsulfate of coconut oil. Especially suitable is

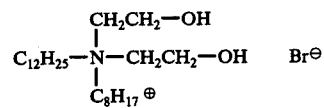

for which the $C_{12}H_{25}$-residue consists of the statistical average of $C_8$—, $C_{10}$—, $C_{12}$—, $C_{14}$—, $C_{16}$— and $C_{18}$— components. The OH groups may be partially or completely etherified or esterified. Because of the slight thermal stability of the highly polar components of Group D having ionic groups and because of their poor compatibility, only the minimum required amounts of these compounds are used. Antistatically active compounds of Groups C and D are described comprehensively by W. Biedermann, "Plaste und Kautschuk", 16, 8 - 15 (1969) as well as by L. R. Kumar in Silk, Rayon Ind., India 12, 315 - 333 (1969).

The invention therefore relates especially to finishes which consist of
 1 - 99% by weight of organosilicon compounds (Group A) as described above,
 0 - 80% by weight of nonpolar or weakly polar oils (Group B),
 0 - 40% of nonionic compounds (Group C) and
 0 - 20% by weight of ionic surfactants (Group D), whereby at least 1% by weight of C and D together must be present. At the same time, finishes are especially preferred which consist of 10 – 95% by weight of organosilicon compounds (Group A) described above, 0 – 80% by weight of nonpolar or weakly polar oils (Group B)

0 – 40% by weight of nonionic compounds (Group C) and

0 – 15% by weight of ionic surfactants (Group D).

A further especially preferred finish is characterized by the fact that it consists of 80 to 95% by weight of a siloxane having the formula

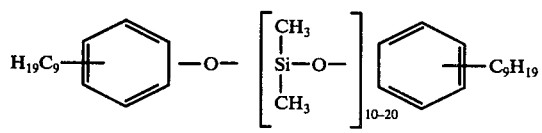

and 5 – 20% by weight of a compound of the formula

R-N—(CH$_2$CH$_2$OH)$_2$ whereby R is an alkyl residue with 8 – 18 and especially 12 carbon atoms.

Depending on the form of the application, these substances can be used in the above described mixture in the undiluted state or diluted in the form of solutions, wherein hydrocarbons are preferably suitable as solvents, or in the form of emulsions whereby additional suitable conventional emulsifiers can be used.

Yet other conventional additives, appropriate to the state of the art, such as, for example, oxidation inhibitors, such as, for example, phenols (e.g., dicresylpropane) or sodium hypophosphite, can, in addition, be added to these finishes.

On the basis of the good compatibility of the aryloxy-substituted silicone oils and within the scope of the compositions shown, it is especially noteworthy that it is possible to prepare solvent free melt-spin finishes which are self-emulsifiable and which are therefore readily washed out; and yet at the same time, which show good compatibility. Such solvent free 100% finishes represent an advance over prior art solutions and emulsions with respect to the contamination of the environment.

Compared to known preparations of the state of the art using conventional silicone oils, the inventive finishes show remarkably decreased yellowing and gelling tendencies on prolonged heating at 200° C and above. The inventive finishes are, in addition, more compatible with subsequently used textile auxiliaries, such as, sizes. In addition, they are more readily washed out and represent an advance especially in those processes, which operate at high rates or in which the heating units exhibit particularly high temperatures (spin-drawing, spin-drawing-texturing, and the like).

In the following examples, the synthesis of the organosilicon compounds as well as their properties and the properties of finishes prepared with these compounds for the treatment of fibers, are described.

EXAMPLE 1 (Synthesis Proces 1)

112.2 g (0.51 equivalents) of nonylphenol are treated with 996 ml toluene. Subsequently, 200 ml toluene are distilled off while stirring in order to azeotropically dry the nonylphenol. The contents of the flask are brought to a temperature of 50° C and treated with 286.3 g (0.50 equivalents) of a chlorosiloxanyl sulfate of the idealized average formula

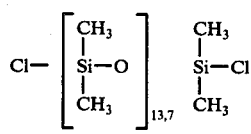

whereby a part of the Cl is replaced by (SO$_4$/2). Subsequently, the mixture is stirred for 30 minutes at 50° C. Thereupon, ammonia is passed in at the same temperature until the mixture becomes alkaline. Stirring is then continued for a further 30 minutes under a mild NH$_3$ cover and the temperature is subsequently lowered to below 30° C. This is followed by an intermediate filtration through a filter press covered with a filter layer of cellulose fibers. The clear filtrate is returned to the flask which is then evacuated. While stirring vigorously, all the distillate is taken off until the contents of the flask reach a temperature of 100° C. When the distillation ceases, stirring is continued for a further ½ hour at a flask content temperature of 100° C under vacuum (20 mm Hg). The contents of the flask are then cooled to ca. 30° C and the vacuum is released. The reaction mixture is filtered again through a filter layer of cellulose fibers. The clear product so produced has a viscosity (at 20° C) of 44.8 cP.

EXAMPLE 2 (Synthesis Process 2)

130 g (0.50 equivalents) of the allyl ether of nonylphenol are heated to a temperature of 120° C. The allyl ether of nonylphenol is synthesized by a known procedure in that nonylphenol is allylated with allyl chloride, potassium hydroxide being used as the acid acceptor. The boiling point of the allyl ether of nonylphenol is 135° C (1.5 mm Hg.). While stirring, 7.25 mg pyridine . C$_2$H$_4$ . PtCl$_2$ (14.5 mg Pt catalyst per mole of allyl ether of nonylphenol) were added at this temperature. Subsequently, 308 g (0.5 equivalents) of a siloxane of average composition

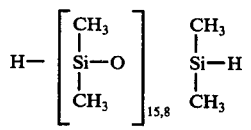

are added dropwise at an initial low rate. Only when the reaction has commenced (this can be seen by a rise in the temperature of the reaction mixture) is the rate of dropwise addition increased in such a way that the addition is completed within 2 hours. Stirring is subsequently continued at a bath temperature of 120° C and the reaction mixture is then cooled. A clear product results, which is colored a faint brown and has a viscosity (20° C) of 152 cP.

Example 3 (Synthesis Process 3)

110 g (0.50 equivalents) nonylphenol are treated with 375 ml toluene. Thereupon, 125 ml toluene are distilled off with stirring, in order to dry the nonylphenol azeotropically. The contents of the flask are brought to 90° C and treated with 0.95 g Sn octoate. Then, 143 g (0.50 equivalents) of a siloxane of the average composition

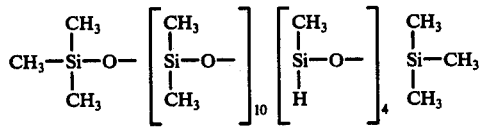

are added dropwise during 2 hours while maintaining an internal temperature of 95° C. There is a vigorous evolution of hydrogen. When the addition of siloxane is completed, the bath temperature is raised to 140° C within 20 minutes and is maintained at this temperature under reflux for 5 hours while stirring vigorously. Subsequently, distillate is taken off under an H₂O vacuum until the contents of the flask reach a temperature of 140° C. When distillation ceases, the stirring is continued for a further ½ hour under vacuum (20 mm Hg) with the temperature of the contents of the flask at 140° C. The contents of the flask are then cooled to ca. 30° C and the vacuum is subsequently released. Filtration is carried out over a filter layer of cellulose fibers. A clear product results which is colored a faint yellow.

The following table is followed by the relevant explanation.

| No. | R¹ | M | a | R² | R⁴ | n | m | Number of Si atoms/mol. | Viscosity (20° C in cP) | Synthesis Process |
|---|---|---|---|---|---|---|---|---|---|---|
| 1 | Pentaerythritol Tetrapelargonate | — | — | — | — | — | — | — | 80.0 | — |
| 2 | Methylsilicone oil 25 cP | — | — | — | — | — | — | >15 | 25.0 | — |
| 3 | $C_4H_9-\overset{H}{\underset{C_2H_5}{C}}-CH_2-$ | — | 0 | $CH_3-$ | — | 7.2 | 0 | 14.4 | 16.0 | — |
| 4 | $(CH_3)_3-Si-$ | — | 0 | 9 $CH_3-$ and 1 $C_{12}H_{25}-$ | — | 5.0 | 0 | 12.0 | 16.0 | — |
| 5 | $(CH_3)_3-Si-$ | — | 0 | 8 $CH_3-$ and 2 $CH_3-C(\overset{O}{\underset{O-(CH_2)_3-}{\parallel}})$ | — | 5.0 | 0 | 12.0 | 23.7 | — |
| 6 | Technical White Oil (%° E) (Brand: Risella G 18 Manufacturer: Shell (AG) | — | — | — | — | — | — | — | 37.5 | — |
| 7 | Nonylphenyl- | — | 0 | $CH_3-$ | — | 6.0 | 0 | 12.0 | 40.7 | 1 |
| 8 | Nonylphenyl- | — | 0 | $CH_3-$ | — | 7.35 | 0 | 14.7 | 44.8 | 1 |
| 9 | Nonylphenyl- | — | 0 | $CH_3-$ | — | 9.0 | 0 | 18.0 | 45.5 | 1 |
| 10 | Dodecylphenyl- | — | 0 | $CH_3-$ | — | 7.75 | 0 | 15.5 | 62.8 | 1 |
| 11 | 2,6-Di-tert.-butylphenyl | — | 0 | $CH_3-$ | — | 7.75 | 0 | 15.5 | 43.9 | 1 |
| 12 | 2,6-Di-sec.-Nonylphenyl | — | 0 | $CH_3-$ | — | 7.75 | 0 | 15.5 | 41.9 | 1 |
| 13 | Nonylphenyl- | — | 0 | $CH_3-$ | $CH_3-$ | 6.4 | 2 | 27.6 | 61.0 | 1 |
| 14 | Nonylphenyl- | $(CH_2)_3-$ | 1 | $CH_3-$ | — | 8.4 | 0 | 16.8 | 152 | 2 |
| 15 | $(CH_3)_3-Si-$ | — | 0 | 10 $CH_3-$ and 4 Nonylphenoxy- | — | 7.0 | 0 | 16.0 | 339 | 3 |
| 16 | Nonylphenyl- | — | 0 | 10 $CH_3-$ and 2 $CH_3-C(\overset{O}{\underset{O-(CH_2)_3-}{\parallel}})$ | — | 6.0 | 0 | 12.0 | 156 | 1 |
| 17 | Nonylphenyl | — | 0 | 10 $CH_3-$ and 2 $C_8H_{17}-$ | — | 6.0 | 0 | 12.0 | 57.0 | 1 |
| 18 | Mixture of 1 and 8; (1 : 1) | — | — | — | — | — | — | — | 64.6 | — |
| 19 | Mixture of 6 and 8; (1 : 1) | — | — | — | — | — | — | — | 41.0 | — |

| No. | Volatile Components (3 g sample weight; metal dish of 5.2 cm diam; 16 hr at 200° C; air circulation) in weight % | Gel Time (hr) at 200° C | Compatibility (25% by weight active material 75% by weight white oil 5° E or ester oil) White Oil 5° E | Pentaerythritol Tetrapelargonate | Viscosity Temperature $\left[1 - \dfrac{\text{Viscosity at 80° C}}{\text{Viscosity at 20° C}}\right]$ | Lubricating Effect at High Yarn-Take-Off Rates (Polyester Yarn at 100 m/min); Coefficient of Friction μ was measured (fiber/metal) μ = 0.20 – 0.24 is good μ > 0.24 is moderate |
|---|---|---|---|---|---|---|
| 1 | 22.3 | 24 | clear | — | 0.85 | moderate |
| 2 | 32.6 | >500 | not miscible | not miscible | 0.65 | good |

-continued

| No. | Volatile Components (3 g sample weight; metal dish of 5.2 cm diam; 16 hr at 200° C; air circulation) in weight % | Gel Time (hr) at 200° C | Compatibility (25% by weight active material 75% by weight white oil 5° E or ester oil) | | Viscosity Temperature $\left[1 - \dfrac{\text{Viscosity at 80° C}}{\text{Viscosity at 20° C}}\right]$ | Lubricating Effect at High Yarn-Take-Off Rates (Polyester Yarn at 100 m/min); Coefficient of Friction $\mu$ was measured (fiber/metal) $\mu = 0.20 - 0.24$ is good $\mu > 0.24$ is moderate |
|---|---|---|---|---|---|---|
| | | | White Oil 5° E | Pentaerythritol Tetrapelargonate | | |
| 3 | — | <16 | clear | clear | 0.66 | good |
| 4 | — | <8 | clear | clear | — | good |
| 5 | — | <8 | clear | clear | — | good |
| 6 | >95.0 | <8 | — | clear | — | moderate |
| 7 | 25.1 | 280 | clear | clear | 0.77 | good |
| 8 | 22.0 | 280 | clear | clear | 0.76 | good |
| 9 | 19.5 | 328 | clear | clear | 0.74 | good |
| 10 | 21.6 | 144 | clear | cloudy | — | good |
| 11 | 26.5 | 456 | clear | cloudy | — | good |
| 12 | 30.0 | >500 | clear | cloudy | — | good |
| 13 | 29.8 | 216 | clear | cloudy | — | good |
| 14 | 14.5 | 144 | clear | cloudy | — | good |
| 15 | 26.0 | 40 | clear | clear | — | good |
| 16 | 31.6 | 40 | clear | clear | — | good |
| 17 | 26.6 | 40 | clear | clear | — | good |
| 18 | 22.3 | 40* | clear | clear | — | good |
| 19 | 58.6 | 280 | clear | clear | — | good |

*much less yellowing than with comparison example 1

Compounds listed under numbers 1 to 6 of the above Table are not in accordance with the invention and represent the state of the art. They are compared with the inventive compounds listed under numbers 7 to 17 and the inventive finishes listed under numbers 18 and 19, which, however, do not contain any polar components.

The compounds listed under numbers 3, 4 and 5, as well as 7 to 17, can be described by the formula given in claim 1 of this application.

The fiber-treating materials, which are not in accordance with the invention and which are listed under numbers 1 and 3 to 6, rapidly gel at 200° C and do not meet the requirements of actual practice. The methylsilicone oil listed under 2, is adequately resistant to gelling. It cannot, however, be used because of its incompatibility with the other components.

In their lubricating effect and in regard to the viscosity-temperature coefficient, the inventive compounds are clearly superior to the "ester oils", such as, pentaerythritol tetrapelargonate, which presently are frequently used. The inventive mixtures listed under 18 and 19 show, in addition, that the gelling time is not determined, as might well have been expect, by the weaker partner in the mixture but in a surprising manner is raised far above the level of the weaker partner. The inventive compounds thus exert a surprising stabilizing effect on other components of the fiber-treating material.

Though the inventive compounds, listed under numbers 10 to 14, do not mix with pentaerythritol tetrapelargonate to form a clear mixture, there is no immediate phase separation as is the case for the methylsilicone oil listed under 2. Relatively stable dispersions are, however, eminently suitable as fiber-treating materials. A comparison of the analyses of the non-inventive compounds listed under 3 with the inventive compounds before and after thermal treatment shows, in addition, that the alkoxy residue of the non-inventive compound 3 is split off during thermal treatment (hydrolysis), whereas the mono-, di- or trialkylphenoxy residues are not split off even when they are linked to the siloxane structure by SiOC bonds.

When subjected to treatment at 200° C, the inventive compounds, in addition, show a much lesser tendency to yellow than products of the state of the art, e.g., such compounds as are listed under 1 and 6.

The test for determining the content of volatile components corresponds to a conventional procedure. A very similar procedure is described, for example, in the U.S. Pat. No. 3,578,594, in Column 15, Paragraph 1, Line 4.

The question, whether the siloxanes used in the mixture are surface active is of particular importance for the effectiveness of the siloxane components in the fiber-treating materials, particularly in regard to improving the lubricating effect. The inventive compounds were therefore added in amounts in each case of 1% to a mineral oil (white oil 5° Engler) and the surface tension was measured. The following results were obtained:

| Compound No. | Surface Tension (dynes/cm) |
|---|---|
| 2 (unmodified methylsilicone oil; forms only a cloudy mixture at 1%) | 23.4 |
| 7 | 24.2 |
| 8 | 24.7 |
| 9 | 24.6 |
| White Oil 5° Engler, without additive | 27.2 |

It can be seen from the measured values that the inventive compounds, in spite of their greatly improved compatibility, lower the surface tension of the mineral oil used almost to the same extent as unmodified methylsilicone oil, which gives only a cloudy mixture with mineral oil even when added only to the extent of 1%.

Only those mixtures can be used as melt-spin finishes which contain a certain percentage of components having an antistatic effect. A compound, having the formula R—N—(CH$_2$CH$_2$OH)$_2$ (R = C$_8$H$_{17}$ to C$_{18}$H$_{37}$, on the average R = C$_{12}$H$_{25}$) can be used, for example, as such a component. Using 95% by weight of the inventively modified silicone oil as listed under No. 7 in the Table, and 5% by weight of the above non-ionic antistat, a clear mixture is obtained having a viscosity of 56.5 cP (20°) and an antistat level which is typical of non-ionic surfactants that are not mixed.

On the other hand, a pure silicone oil is not miscible with this antistat. Although an analogous mixture of 95% by weight of an ester oil (pentaerythritol tetrapelargonate) and 5% by weight of the above antistat is clear, it exhibits a gel time of 24 hours (at 200° C), whereas the above inventive mixture of 95% by weight of modified silicone oil (No. 7 of the table) and 5% by weight of the above antistat has a gel time of more than 200 hours (at 200° C).

What is claimed is:

1. A textile fiber finish composition suitable for use in melt spinning of fibers comprising 1 – 99% by weight of compounds having the formula

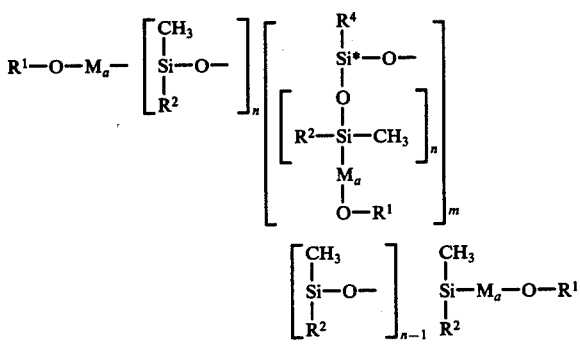

wherein
$R^1$ is mono-, di- or trialkylphenyl in which the sum of the carbon atoms per phenyl, bound in the form of alkyl is at least 6 and at most 12, or is trimethylsilyl,
$R^2$ is alkyl with 1 to 16 carbon atoms, whereby the carbon chain may be interrupted by the groups

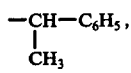

$R^2$ is the $M_a$—O—$R^3$ residue, whereby $R^3$ is a mono-, di-, or trialkylphenyl residue, whereby the sum of the carbon atoms per phenyl residue, bound in the form of alkyl residues, is at least 6 and at most 12, $R^2$ is

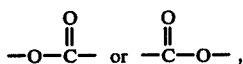

$R^4$ is an alkyl with 1 to 16 carbon atoms

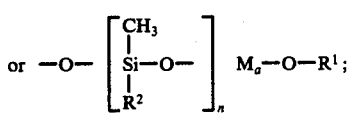

M is an alkyl residue with 1 to 3 carbon atoms, and the indices
$n$ may have any value from 2.5 to 15,
$m$ a value of 0 to 5 and
$a$ a value of 0 or 1,
and the average molecule contains 5 to 30 Si atoms, of which at most 20 mole percent are Si* atoms, and 0.5 to 10 mono-, di- or trialkylphenyl residues; and further comprising 99 – 1% of conventional finish components.

2. The composition of claim 1 wherein $R^4$ is methyl.

3. The composition of claim 1 wherein the average molecule, contained in its organosilicon compound, contains two mono-, di- or trialkylphenyl groups.

4. The composition of claim 1 wherein $R^1$ is an octyl-, dodecyl- or nonyl phenyl group.

5. The composition of claim 1 wherein $n$ has a value of 5 to 10.

6. The composition of claim 1 wherein $m$ is equal to 0.

7. The composition of claim 1 wherein $a$ is equal to 0.

8. The composition of claim 1 wherein the organosilicon compound contains 10 to 20 Si atoms.

9. The composition of claim 1 consisting of
1 to 99% by weight of the organosilicon compounds,
0 to 80% by weight of nonpolar or weakly polar oils,
0 to 40% by weight of nonionic surfactants,
0 to 20% by weight of ionic surfactants,
whereby the sum of the components amounts to 100% by weight and the proporation of nonionic and ionic surfactants is at least 1% by weight.

10. The composition of claim 9 consisting of
10 to 95% by weight of compounds of the organosilicon compound,
0 to 80% by weight of nonpolar and weakly polar oils,
0 to 40% by weight of nonionic surfactants,
0 to 15% by weight of ionic surfactants,
whereby the sum of the components amounts to 100% by weight.

11. The composition of claim 1 consisting of 80 to 95% by weight of a siloxane of the formula

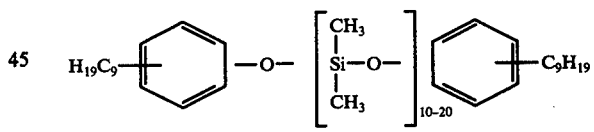

and 5 to 20% by weight of a compound of the formula

R—N—(CH₂CH₂OH)₂ whereby R is an alkyl residue with 8 to 18 carbon atoms.

12. The composition of claim 1 wherein it exists as a solution in a solvent or as an emulsion in a liquid in which it is not soluble.

* * * * *